US011568567B2

(12) United States Patent
Witherspoon et al.

(10) Patent No.: US 11,568,567 B2
(45) Date of Patent: Jan. 31, 2023

(54) SYSTEMS AND METHODS TO OPTIMIZE PERFORMANCE OF A MACHINE VISION SYSTEM

(71) Applicant: ZEBRA TECHNOLOGIES CORPORATION, Lincolnshire, IL (US)

(72) Inventors: James Matthew Witherspoon, Howell, MI (US); David D. Landron, Coram, NY (US); Ankan Basak, Astoria, NY (US); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/945,361

(22) Filed: Jul. 31, 2020

(65) Prior Publication Data

US 2022/0036585 A1    Feb. 3, 2022

(51) Int. Cl.
| | | |
|---|---|---|
| G06T 7/80 | (2017.01) | |
| G06T 7/70 | (2017.01) | |
| G06F 3/0482 | (2013.01) | |
| G06K 9/62 | (2022.01) | |
| G06T 7/33 | (2017.01) | |

(52) U.S. Cl.
CPC .............. *G06T 7/80* (2017.01); *G06F 3/0482* (2013.01); *G06K 9/6254* (2013.01); *G06K 9/6263* (2013.01); *G06T 7/337* (2017.01); *G06T 7/70* (2017.01); *G06T 2200/24* (2013.01)

(58) Field of Classification Search
CPC ......... G06T 7/80; G06T 7/70; G06T 2200/24; G06T 7/74; G06T 2207/30168; G06T 7/337; G06F 3/0482; G06K 9/6263; G06K 9/6254
See application file for complete search history.

(56) References Cited

U.S. PATENT DOCUMENTS

| | | | |
|---|---|---|---|
| 6,323,776 B1 * | 11/2001 | Jackson | G01B 11/00 340/679 |
| 7,336,814 B2 * | 2/2008 | Boca | G06K 9/32 382/141 |
| 7,636,449 B2 * | 12/2009 | Mirtich | G06F 9/451 382/100 |

(Continued)

*Primary Examiner* — Andrew L Tank
(74) *Attorney, Agent, or Firm* — Yuri Astvatsaturov

(57) ABSTRACT

Methods and systems for optimizing performance of a machine vision system are disclosed herein. An example method includes obtaining one or more first and second images of a target object, where each of the one or more first and second images include a pass indication and a fail indication, respectively. The example method further includes conducting, by a feasibility setup tool, a feasibility setup analysis by (i) performing machine vision techniques on each of the one or more first and second images and (ii) generating a respective updated result indication for each of the one or more first and second images. The example method further includes comparing the respective updated result indication to the respective pass indications and fail indications for the one or more first and second images, respectively; and based on the comparing, generating one or more suggestions to optimize the performance of the machine vision system.

20 Claims, 7 Drawing Sheets

(56) References Cited

U.S. PATENT DOCUMENTS

| | | | |
|---|---|---|---|
| 8,126,253 B2 * | 2/2012 | Wallack | G06K 9/6263 |
| | | | 382/141 |
| 2016/0180510 A1 * | 6/2016 | Grau | G06T 7/80 |
| | | | 348/47 |
| 2019/0005360 A1 * | 1/2019 | Heide | G06T 5/003 |
| 2020/0410082 A1 * | 12/2020 | Sharieh | H04L 63/10 |
| 2021/0090180 A1 * | 3/2021 | Navarrete | G06K 9/6267 |

* cited by examiner

SYSTEMS AND METHODS TO OPTIMIZE PERFORMANCE OF A MACHINE VISION SYSTEM

BACKGROUND

Ever since the introduction of machine vision systems to industrial settings, developers have been attempting to reduce their corresponding cost requirements. These systems are capable of executing machine vision jobs to provide high fidelity image analysis at a cost of capturing images under finely tuned imaging settings (e.g., exposure length, imaging system orientation/positioning). Typically, a technician may spend hours or more tuning these imaging settings, and may never reach an adequate configuration. For example, an operator may include multiple machine vision tools in each machine vision job, and an operator may be unable to determine specific imaging setting adjustments for each machine vision tool. When a machine vision job fails to sufficiently perform the high fidelity image analysis, a user/operator may place the machine vision system into a bypass mode or the entire line (e.g., a production line) may be stopped so the technician can attempt to manually diagnose (e.g., troubleshoot) the problem.

Unfortunately, stopping the entire line for any amount of time or placing the machine vision system into bypass mode can create a myriad of problems. For example, stopping the entire line, such as an industrial manufacturing or shipping line, normally results in massive economic losses and can take hours/days to start again. Moreover, placing the machine vision system into bypass mode allows parts to pass the system without being inspected. As a result, bypass mode allows low quality or otherwise bad parts to make it out of the production facility.

Thus, there is a need for systems and methods to optimize the performance of a machine vision system that allow for proactive, real-time system adjustments to the machine vision system.

SUMMARY

In an embodiment, the present invention is a method for optimizing a performance of a machine vision system. The method includes obtaining, by one or more processors, one or more first images of a target object, each of the one or more first images including a pass indication. The method further includes obtaining, by the one or more processors, one or more second images of the target object, each of the one or more second images including a fail indication. The method further includes conducting, by a feasibility setup tool executed on the one or more processors, a feasibility setup analysis by (i) performing one or more machine vision techniques on each of the one or more first images and each of the one or more second images and (ii) generating a respective updated result indication for each of the one or more first images and each of the one or more second images. The method further includes comparing, by the one or more processors, the respective updated result indication to (i) the respective pass indication for each of the one or more first images and (ii) the respective fail indication for each of the one or more second images. The method further includes, based on the comparing, generating, by the one or more processors, one or more suggestions to optimize the performance of the machine vision system.

In a variation of this embodiment, conducting the feasibility setup analysis further includes generating a respective quality value for each of the one or more first images and each of the one or more second images. Further in this variation, the respective quality value may include an indication of one or more of (i) a brightness level, (ii) a contrast level, (iii) a feature edge strength value, or (iv) a focus value. Still further in this variation, the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

In another variation of this embodiment, the method further comprises: displaying, on a graphical user interface (GUI), each of the one or more suggestions for viewing by a user; obtaining, by the one or more processors, a user input indicating an acceptance of one or more of the one or more suggestions; and, responsive to the user input, automatically adjusting, by the one or more processors, a feature indicated in the one or more of the one or more suggestions.

In yet another variation of this embodiment, the feasibility setup tool applies a sequence of a set of machine vision tools, each tool including a configuration to perform one or more of the one or more machine vision techniques. Further in this variation, the one or more suggestions include at least one of (i) an adjustment to the configuration of a respective machine vision tool, (ii) an adjustment to the sequence of the set of machine vision tools, or (iii) an adjustment to a set of imaging device settings. Moreover, each of the set of imaging device settings includes one or more of (i) an aperture size, (ii) an exposure length, (iii) an ISO value, (iv) a focus value, (v) a gain value, or (vi) an illumination control. Still further in this variation, the one or more machine vision tools include at least one of (i) a barcode scanning tool, (ii) a pattern matching tool, (iii) an edge detection tool, (iv) a semantic segmentation tool, (v) an object detection tool, or (vi) an object tracking tool.

In another embodiment, the present invention is a computer system for optimizing a performance of a machine vision system. The computer system includes one or more processors and a non-transitory computer-readable memory coupled to the imaging device and the one or more processors. The memory stores instructions thereon that, when executed by the one or more processors, cause the one or more processors to: obtain one or more first images of a target object, each of the one or more first images including a pass indication; obtain one or more second images of the target object, each of the one or more second images including a fail indication; execute a feasibility setup tool to conduct a feasibility setup analysis by (i) performing one or more machine vision techniques on each of the one or more first images and each of the one or more second images and (ii) generating a respective updated result indication for each of the one or more first images and each of the one or more second images; compare the respective updated result indication to (i) the respective pass indication for each of the one or more first images and (ii) the respective fail indication for each of the one or more second images; and based on the comparing, generate one or more suggestions to optimize the performance of the machine vision system.

In a variation of this embodiment, conducting the feasibility setup analysis further includes generating a respective quality value for each of the one or more first images and each of the one or more second images. Further in this variation, the respective quality value may include an indication of one or more of (i) a brightness level, (ii) a contrast level, (iii) a feature edge strength value, or (iv) a focus value. Still further in this variation, the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

In another variation of this embodiment, the instructions, when executed by the one or more processors, further cause the one or more processors to: display, on a graphical user interface (GUI), each of the one or more suggestions for viewing by a user; obtain a user input indicating an acceptance of one or more of the one or more suggestions; and responsive to the user input, automatically adjust a feature indicated in the one or more of the one or more suggestions.

In yet another variation of this embodiment, the feasibility setup tool applies a sequence of a set of machine vision tools, each tool including a configuration to perform one or more of the one or more machine vision techniques.

In yet another embodiment, the present invention is a tangible machine-readable medium comprising instructions for optimizing a performance of a machine vision system. When executed, the instructions cause a machine to at least: obtain one or more first images of a target object, each of the one or more first images including a pass indication; obtain one or more second images of the target object, each of the one or more second images including a fail indication; execute a feasibility setup tool to conduct a feasibility setup analysis by (i) performing one or more machine vision techniques on each of the one or more first images and each of the one or more second images and (ii) generating a respective updated result indication for each of the one or more first images and each of the one or more second images; compare the respective updated result indication to (i) the respective pass indication for each of the one or more first images and (ii) the respective fail indication for each of the one or more second images; and based on the comparing, generate one or more suggestions to optimize the performance of the machine vision system.

In a variation of this embodiment, conducting the feasibility setup analysis further includes generating a respective quality value for each of the one or more first images and each of the one or more second images. Further in this variation, the respective quality value may include an indication of one or more of (i) a brightness level, (ii) a contrast level, (iii) a feature edge strength value, or (iv) a focus value. Still further in this variation, the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

In another variation of this embodiment, the instructions, when executed, further cause the machine to at least: display, on a graphical user interface (GUI), each of the one or more suggestions for viewing by a user; obtain a user input indicating an acceptance of one or more of the one or more suggestions; and, responsive to the user input, automatically adjust a feature indicated in the one or more of the one or more suggestions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
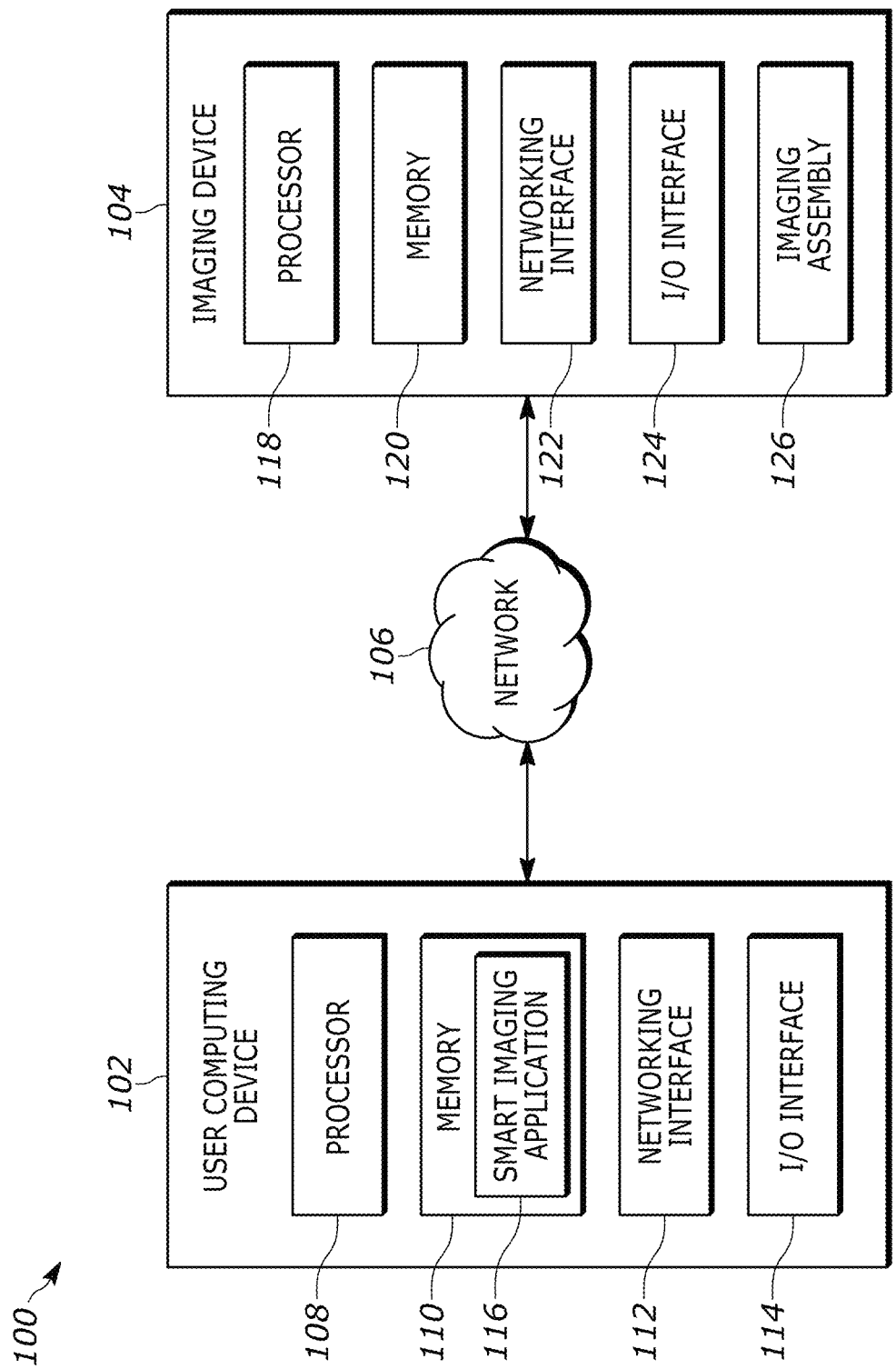
FIG. 1 is an example system for optimize the performance of a machine vision system, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Machine vision system owners/operators have conventionally been plagued with being unable to achieve high fidelity image analysis consistently without eventually placing the machine vision system in bypass mode or taking an entire production line offline to adjust the system settings. These conventional avenues cost machine vision system owners large sums of money, lost production time, and can risk placing inoperative, malformed, malfunctioning, and/or otherwise deficient parts into the marketplace. Thus, it is an objective of the present disclosure to eliminate these and other problems with conventional machine vision systems by enabling the proactive adjustment of one or more features of a machine vision system prior to the execution of one or more machine vision jobs to optimize the performance of the machine vision system. As described herein, the embodiments of the present disclosure may reduce the need for costly production line downtime, eliminate the need to place the machine vision system in a risky bypass mode, and may ensure that the system maximizes image capture and processing efficiency.

FIG. 1 illustrates an example smart imaging system 100 configured to analyze pixel data of an image of a target object to optimize the performance of a machine vision system, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. Moreover, the smart imaging application 116 may include a feasibility setup tool configured to perform a feasibility setup analysis on one or more stored images, and/or the feasibility setup tool may be stored on the one or more memories 120. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
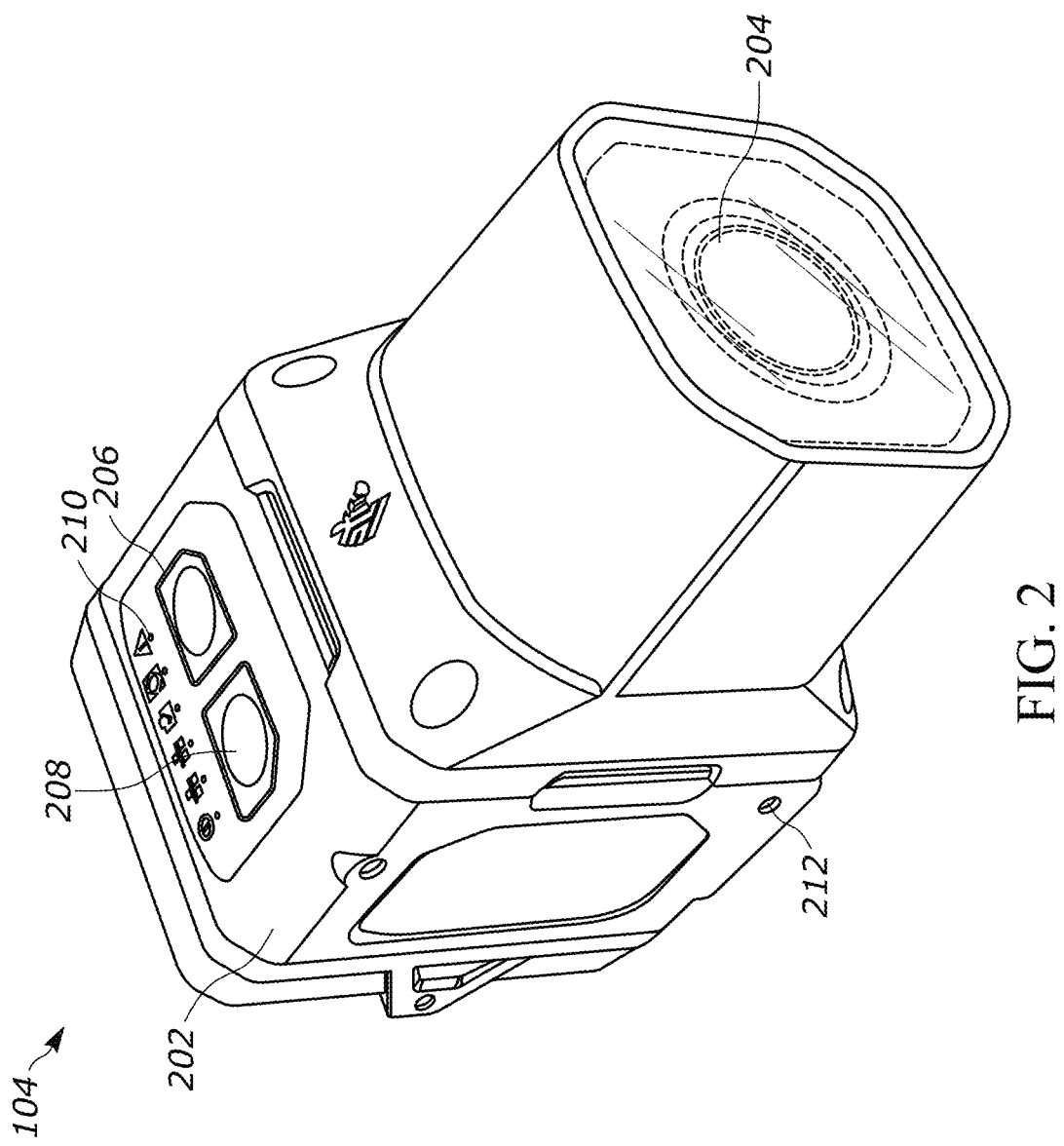
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC- Link, USB 3.0, RS-232, and/or any other suitable communication protocol or combinations thereof.

Figure 3:
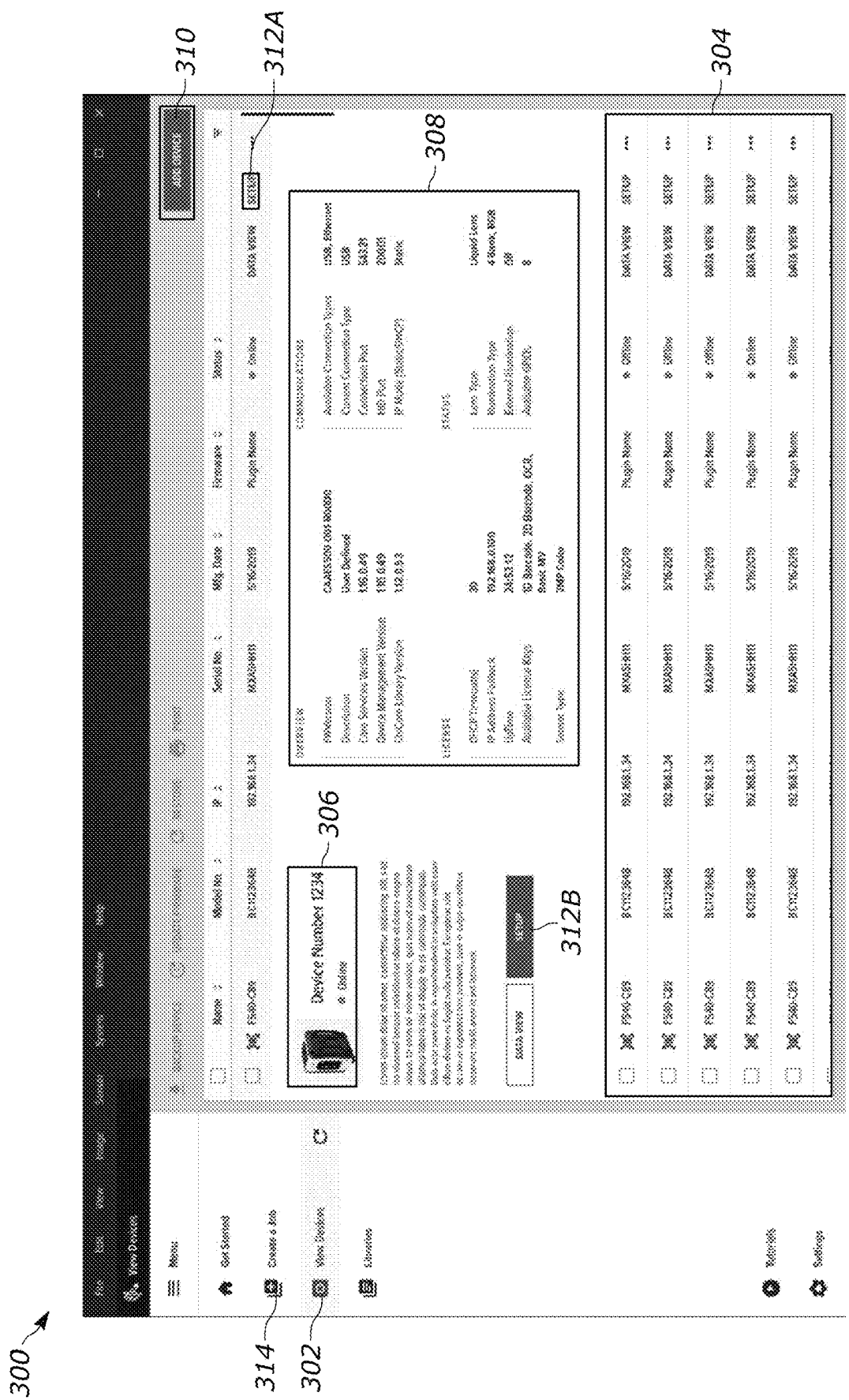
FIG. 3 depicts an example application interface utilized to optimize the performance of a machine vision system, in accordance with embodiments described herein.

FIG. 3 depicts an example application interface 300 utilized to optimize the performance of a machine vision system, in accordance with embodiments described herein. Generally, the example application interface 300 may represent an interface of a smart imaging application (e.g., smart imaging application 116) a user may access via a user computing device (e.g., user computing device 102). Specifically, the example application interface 300 may present a user with a list of all available devices (e.g., imaging device 104) to which a user may connect and/or construct machine vision jobs when the user selects the view devices tab 302. From here, the user may view the device selection list 304, which may display each connected device a user may access, and may further include information such as, but without limitation, a device name, a device model number, an IP address corresponding to the device, a device serial number, a device manufacture date, a device firmware status, a device online status, and/or any other suitable indication.

The user may then select a device, indicated by the selected device indicator 306, from the device selection list 304, intending to configure and/or otherwise view some setting of the device. The selected device indicator 306 may display the device name and the device online status, and may additionally or alternatively include any other information related to the device. Upon selection of the device indicated in the selected device indicator 306, the smart imaging application 116 may additionally display a selected device configuration listing 308 within the example application interface 300. The selected device configuration listing 308 may include a variety of information concerning the selected device such as, but without limitation, a selected device general overview (e.g., firmware updates, library updates, etc.), a selected device licenses overview (e.g., DHCP timeout(s), IP address fallback, etc.), a selected device communications overview (e.g., available connection types, current connection type, etc.), a selected device status overview (e.g., lens type, illumination type, etc.), and/or any other suitable information or combinations thereof.

In addition, the selected device configuration listing 308 may include an indication of the machine vision jobs executed, stored, and/or otherwise associated with the selected device. For example, the selected device configuration listing 308 may indicate that the selected device is configured to operate in accordance with a first machine vision job that was uploaded to the selected device at a first time (e.g., "Uploaded at 10:00 AM on 10/10/18"). The selected device configuration listing 308 may additionally indicate that the first machine vision job includes a first configuration of one or more image settings corresponding to the selected device and a second configuration of the one or more image settings corresponding to the selected device. Each of the one or more image settings included in the first and second configuration may additionally be displayed in the selected device configuration listing 308.

The example application interface 300 may additionally include an add device function 310 to allow a user to add additional devices, for example, not found in the device selection list 304. If a user acquires a new device, such as an imaging device (e.g., imaging device 104) the user may click, swipe, and/or otherwise interact with the add device function 310 to add the new device to the device selection list 304. Moreover, once the new device has been added, the user may interact with the setup device functions 312A/B to configure and/or otherwise view the settings corresponding to the new device. Accordingly, the user may interact with the setup device functions 312A/B at any time after a device is added to the device selection list 304 to adjust, view, or otherwise manage the device settings.

Additionally or alternatively, when the user interacts with the setup device functions 312A/B the smart imaging application 116 may generate/render a new interface allowing the user to configure a machine vision job for the selected device (e.g., as indicated by the selected device indicator 306). The user may additionally cause the smart imaging application 116 to generate/render the new interface by interacting with the job creation tab 314. In this manner, the user may transition away from the example application interface 300 to configure a machine vision job corresponding to the selected device through an interaction with either the setup device function 312A/B or the job creation tab 314.

Figure 4A:
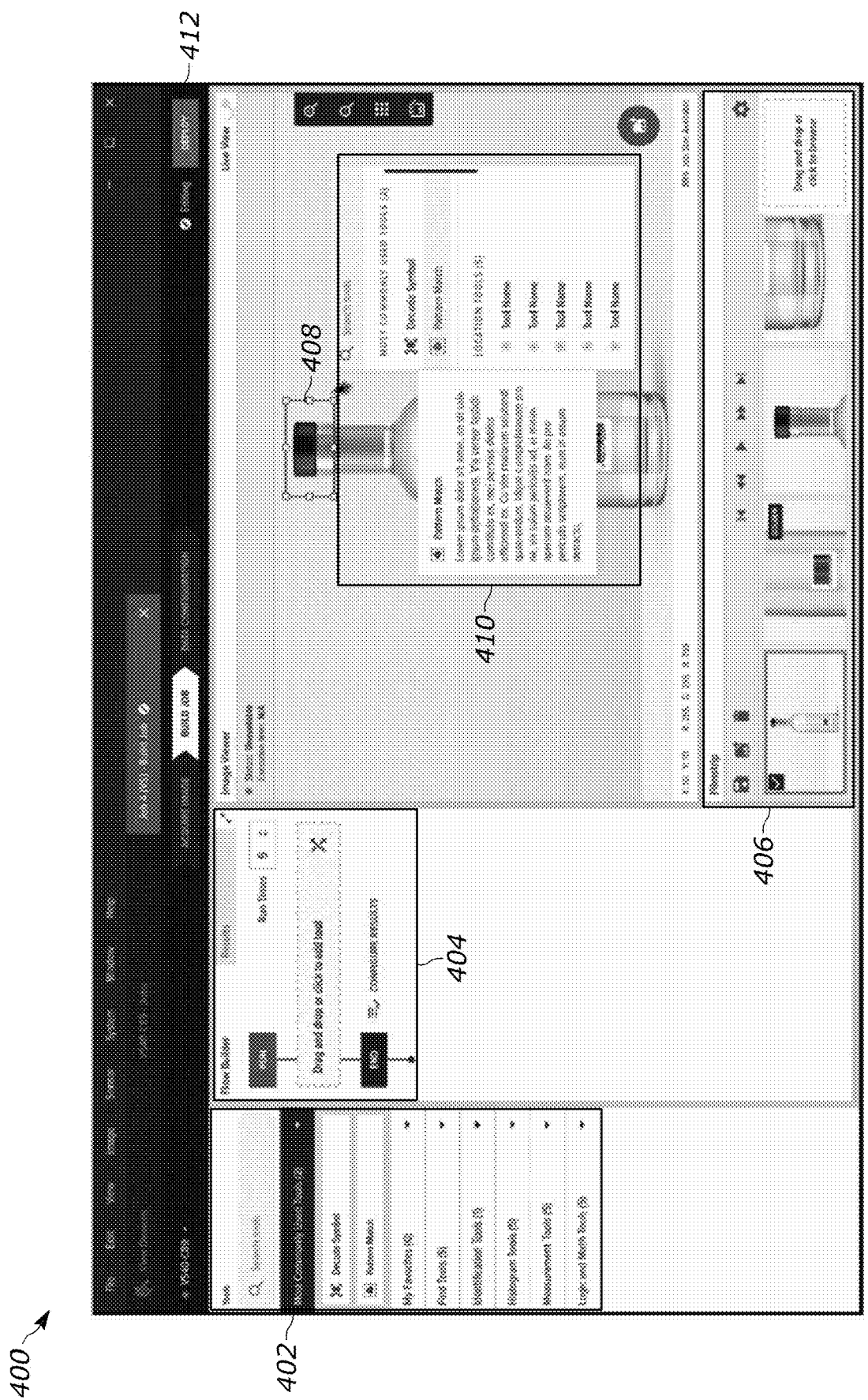
FIG. 4A depicts an additional application interface utilized to optimize the performance of a machine vision system, in accordance with embodiments described herein.

FIG. 4A depicts an additional application interface utilized to optimize the performance of a machine vision system, in accordance with embodiments described herein. For example, after interacting with the job creation tab (e.g., job creation tab 314) and/or the setup device function (e.g., setup device function 312A/B), the smart imaging application (e.g., smart imaging application 116) may transition the user to a job construction application interface 400. Generally, the user may utilize the job construction application interface 400 to organize and configure machine vision tools into a particular sequence that defines a respective machine vision job. The user may additionally utilize the job construction application interface 400 to upload the respective machine vision job to an imaging device (e.g., imaging device 104) for interpretation and execution.

To build a machine vision job, the user may select tools configured to perform machine vision functions. The user may select a tool by clicking, swiping, dragging, and/or otherwise interacting with the available tool(s) list 402. Each tool may be included in drop-down list (as illustrated) of the available tool(s) list 402, or may be plainly visible to the user on the available tool(s) list 402. In any event, the user may select and move a desired tool over to the job flow builder section 404 to begin constructing a machine vision job. In the job flow builder section 404, the user may organize each selected tool into an optimal/preferential order based upon the requirements of the machine vision job. Further, the user may configure each tool to more accurately satisfy the requirements of the machine vision job. For example, the user may configure a barcode scanning tool selected from the available tool(s) list 402 to scan over a larger/smaller area of image(s) captured by the selected device (e.g., imaging device 104).

The user may also select a representative image from the job filmstrip 406 in order to complete configuration of the selected tools. The job filmstrip 406 may include real-time images from the selected device, or they may be stored images (e.g., in the one or more memories 110, 120) that are representative of an ideal image capture for the machine vision job. Additionally or alternatively, the smart imaging application 116 may automatically populate the job filmstrip 406 based on the selected tools in the job flow builder section 404. Once selected, the representative image may appear in a larger section above the job filmstrip 406 that enables the user to place tool ROIs 408 over the representative image. A tool ROI 408 indicates a region of the representative image that the tool represented by the tool ROI 408 may analyze using a machine vision technique. For example, if the tool ROI 408 represents the ROI of a barcode scanning tool, then the barcode scanning tool will scan for a barcode within the region of the representative image indicated by the tool ROI 408.

If the user cannot decide on an appropriate tool for a machine vision job, the user may click, swipe, and/or otherwise interact with the job construction application interface 400 and the smart imaging application 116 may generate/render the tool information region 410. The smart imaging application 116 may provide a user with commonly used tool suggestions, tool type suggestions, descriptions of each tool included in the tool information region 410, and/or any other suitable information of combinations thereof. For example, the smart imaging application 116 may provide a user with an option in the tool information region 410 to search for a particular tool by typing, speaking, and/or otherwise indicating a name, function, or other representative quality of the tool.

When the user has selected and/or ordered one or more tools, and thus created a machine vision job, the job deployment toggle 412 allows a user to upload the machine vision job to the selected device (e.g., imaging device 104). The smart imaging application 116 may register the user interaction with the job deployment toggle 412 and convert the machine vision job to a job file that is then transmitted (e.g., via network 106) to the selected device. The machine vision job may also be stored in memory (e.g., one or more memories 110, 120). The user may additionally toggle the uploaded machine vision job into active/inactive use by interacting with the job deployment toggle 412. Thereafter, the user may adjust configurations/settings associated with the machine vision job by accessing the machine vision job and interacting with the one or more tools in the available tool(s) list 402 and/or the job builder flow section 404, the images in the job filmstrip 406, the tool ROIs 408, and/or by the options within the tool information region 410.

In various embodiments, the job construction application interface 400 allows a user to construct multiple machine vision jobs to be executed in sequence for a selected device (e.g., imaging device 104). For example, the job construction application interface 400 may allow a user to construct a first machine vision job comprising a first set of tools that adjust the configuration of the selected device to a first configuration. The first configuration may include one or more imaging settings of the selected device such as, without limitation, an aperture size, an exposure length, an ISO value, and/or any other suitable value or combinations thereof. The job construction application interface 400 may also allow the user to construct a second machine vision job comprising a second set of tools that adjust the configuration of the selected device to a second configuration. The second set of tools may be the same or different from the first set of tools, and the second configuration may be the same or different from the first configuration. In any event, the smart imaging application 116 may transmit both machine vision jobs to the selected device, and may store both machine vision jobs in memory (e.g., one or more memories 110, 120). Thereafter, the selected device may sequentially perform the first machine vision job and the second machine vision job automatically, e.g., may capture at least one image in accordance with the first configuration, automatically adjust to the second configuration, and capture at least one image in accordance with the second configuration.

Figure 4B:
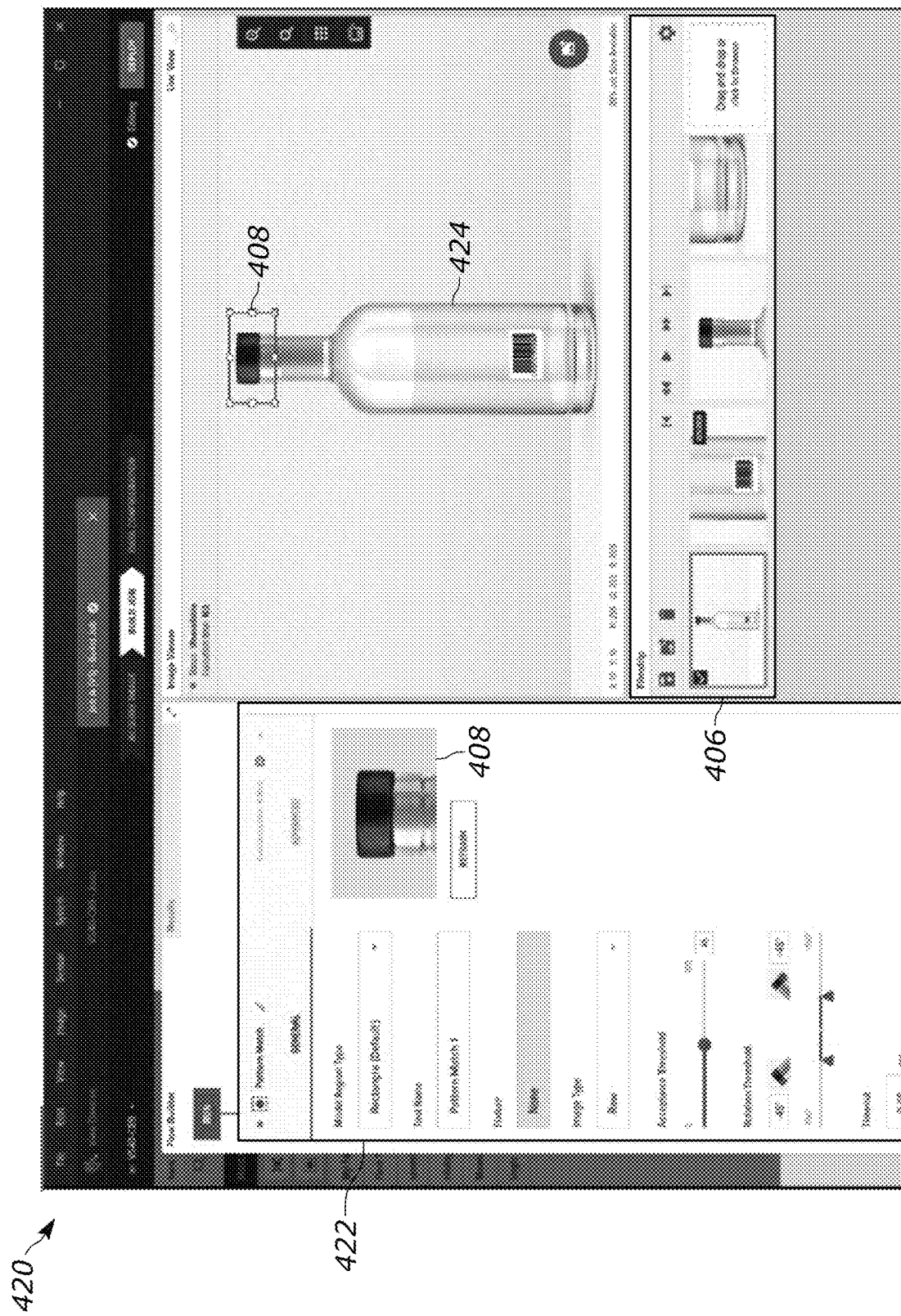
FIG. 4B depicts yet another application interface utilized to optimize the performance of a machine vision system, in accordance with embodiments described herein.

However, the user may desire to configure the specific functionality of each tool included in the job builder flow section 404. Thus, in reference to FIG. 4B, the user may interact with a tool in the job builder flow section 404 or other area of the job construction application interface 400, and the smart imaging application 116 may generate/render the tool configuration application interface 420. The tool configuration application interface 420 may enable a user to customize the specific functionality of each tool included in a machine vision job via the user-selectable options present in the tool configuration region 422. For example, the tool configuration region 422 may include tool configuration options such as, without limitation, a tool model region type, a tool name, a tool fixture, a tool image type, a tool acceptance threshold, a tool rotation threshold, a tool timeout, and/or any other suitable tool configuration option. To illustrate, a user may configure the tool rotation threshold corresponding to the tool ROI 408 based upon the relatively minimal rotation of the cap of the target object 424 featured in the image. In this manner, the smart imaging application 116 allows a user to fully customize the selection, order, and individual configuration of each tool included in a machine vision job.

Further, in various embodiments, one or more tools included in the job builder flow section 404 may be artificial intelligence (AI) based tools trained with at least one AI algorithm. For example, training a barcode location tool may involve image analysis of hundreds, thousands, or millions of training images featuring pixel data of objects with barcodes to configure weights of the barcode location tool, and its underlying algorithm (e.g., machine learning or artificial intelligence algorithm) used to predict and/or classify barcode locations in future images. In this example, one or more processors of a computing platform (e.g., user computing device 102) may receive the plurality of training images of the objects with barcodes via a computer network (e.g., network 106). The computing platform may also train the barcode location tool with the pixel data of the plurality of training images.

In various embodiments, an AI tool (e.g., AI barcode location tool), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on a computing platform (e.g., user computing device 102). For example, libraries may include the TENSORFLOW based library, the PYTORCH library, and/or the SCIKIT-LEARN Python library.

Machine learning may involve identifying and recognizing patterns in existing data (such as training a tool based on pixel data of images including one or more target objects with barcodes) in order to facilitate making predictions or identification for subsequent data (such as using the tool on new pixel data of a new target object in order to determine whether the new target object includes a barcode and/or where the barcode is located on the new target object).

Machine learning model(s), such as the AI barcode location tool described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the tool, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of tools until a satisfactory tool, e.g., a tool that provides sufficient prediction accuracy when given test level or production level data or inputs, is generated. The disclosures herein may use one or both of such supervised or unsupervised machine learning techniques.

Generally, pixel data comprises points or squares of data within an image, where each point or square represents a single pixel within an image. Each pixel may be a specific location within an image. In addition, each pixel may have a specific color (or lack thereof). Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) is used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 255 and be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values. So (Red=220, Green=220, Blue=220) is a light gray (near white), and (Red=40, Green=40, Blue=40) is a dark gray (near black).

In this way, the composite of three RGB values creates the final color for a given pixel. With a 24-bit RGB color image using 3 bytes there can be 256 shades of red, and 256 shades of green, and 256 shades of blue. This provides 256×256× 256, i.e., 16.7 million possible combinations or colors for 24 bit RGB color images. In this way, the pixel's RGB data value shows how much of each of Red, and Green, and Blue the pixel is comprised of. The three colors and intensity levels are combined at that image pixel, i.e., at that pixel location on a display screen, to illuminate a display screen at that location with that color. It is to be understood, however, that other bit sizes, having fewer or more bits, e.g., 10-bits, may be used to result in fewer or more overall colors and ranges.

As a whole, the various pixels, positioned together in a grid pattern, form a digital image (e.g., pixel data $202ap$, $202bp$, and/or $202cp$). A single digital image can comprise thousands or millions of pixels. Images can be captured, generated, stored, and/or transmitted in a number of formats, such as JPEG, TIFF, PNG and GIF. These formats use pixels to store represent the image.

Image analysis may include training a machine learning based tool (e.g., an AI barcode location tool) on pixel data of images including one or more target objects with barcodes. Additionally, or alternatively, image analysis may include using a machine learning based tool, as previously trained, to determine, based on the pixel data (e.g., including their RGB values) of one or more images including one or more target objects, whether each of the one or more target objects includes a barcode and/or where the barcode is located on each of the one or more target objects. The weights of the tool may be trained via analysis of various RGB values of barcode pixels of a given image. For example, dark or low RGB values (e.g., a pixel with values R=25, G=28, B=31) may indicate the typically black colored region of a barcode. A lighter RGB value (e.g., a pixel with R=210, G=234, and B=241) may indicate the typically white region of a barcode (e.g., spaces between the black barcode bars or black square of a QR code).

Together, when a series of pixels in an analyzed region transition from dark or low RGB values to lighter RGB values (or vice versa) in a consistent succession, that may indicate the presence of a barcode represented by the series of pixels. For example, an image may feature a front surface of a target object, wherein the front surface includes a barcode near the bottom of the image. The AI barcode location tool may analyze one or more regions of the image until the AI barcode location tool analyzes a respective region including pixels representative of the target object's barcode. The AI barcode location tool may recognize that the pixels are indicative of the barcode because the pixels may have a succession of very dark RGB value pixels contrasted with very light RGB value pixels. In this way, pixel data (e.g., detailing one or more features of a target object, such as a respective target object's barcode) of thousands or millions of training images may be used to train or use a machine learning tool (e.g., AI barcode location tool) to determine a presence/location of a barcode and/or any other suitable machine vision technique described herein.

Figure 5:
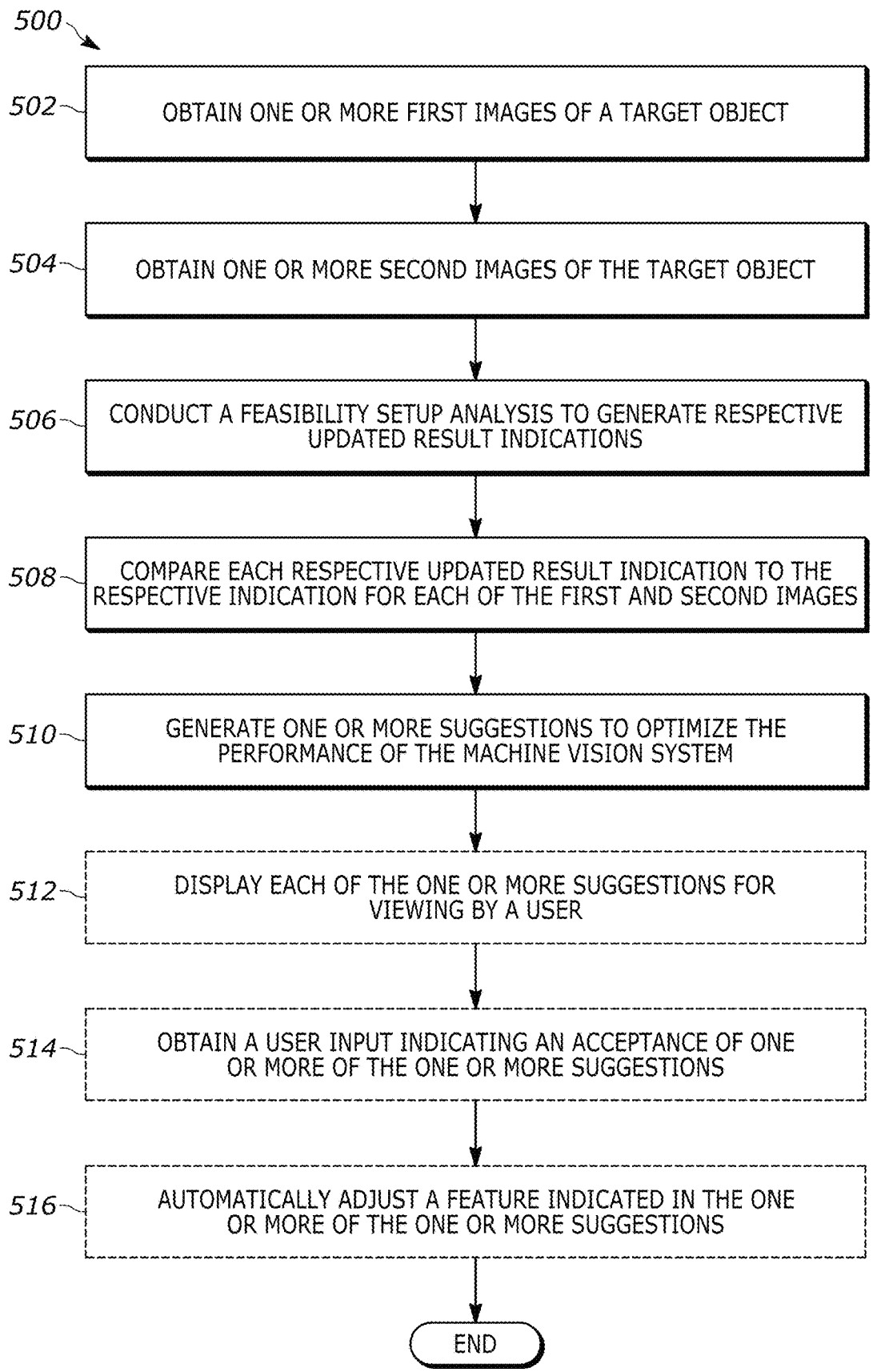
FIG. 5 is a flowchart representative of a method for optimizing the performance of a machine vision system, in accordance with embodiments described herein.

FIG. 5 is a flowchart representative of a method 500 for optimizing a performance of a machine vision system, in accordance with embodiments described herein. Method 500 describes various methods for optimizing a performance of a machine vision system, and embodiments of the method 500 are discussed below in context with FIG. 6. Generally speaking, the method 500 for optimizing a performance of a machine vision system includes obtaining a plurality of images of a target object, conducting a feasibility setup analysis, comparing the results of the feasibility setup analysis to the plurality of images, and automatically generating one or more suggestions to optimize the machine vision system performance. In this manner, the present embodiments may proactively test new and/or adjusted machine vision job(s) to be uploaded and/or executed by a machine vision system (e.g., imaging device 104 and external components) on known passing/failing images to determine whether or not the new and/or adjusted machine vision job(s) are adequately configured to make pass/fail determinations on new images. In the event that the new and/or adjusted machine vision job(s) are not adequately configured, the present embodiments may also make recommendations and automatic adjustments to the new and/or adjusted machine vision job(s) configurations, and as a result, cause the new and/or adjusted machine vision job(s) to be adequately configured to make pass/fail determinations on new images.

Figure 6:
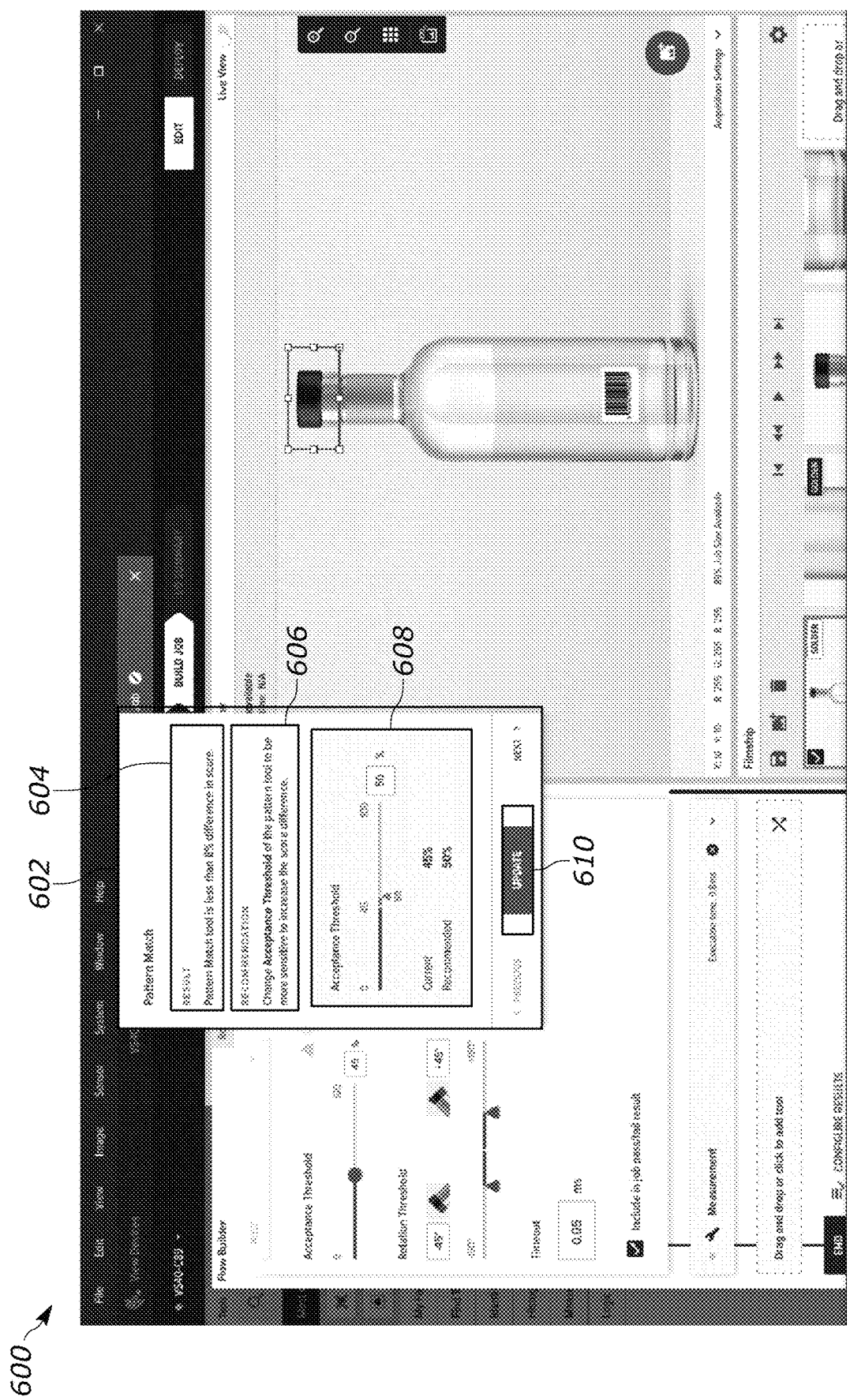
FIG. 6 depicts an example application interface generated as a result of the execution of a feasibility setup tool in order to optimize the performance of a machine vision system, in accordance with embodiments described herein.

It is to be understood that, when described in reference to FIGS. 5 and 6, the imaging device 104 and/or the imaging assembly 126 may comprise a single camera configured to perform the various actions and functionalities described herein. However, in various embodiments, the imaging device 104 may include multiple cameras. Further, it is to be appreciated that at least portions of the method 500 may be performed by utilizing the embodiments of the imaging device 104, the imaging assembly 126, and/or the user computing device 102 of FIG. 1, for example, or by other suitable devices or systems. In embodiments, the method 500 may include additional or alternate steps other than those described herein.

In addition, for simplicity, each set of imaging device settings discussed in reference to FIGS. 5 and 6 is described in terms of one or more sets of machine vision tools. For example, a first image may be captured in accordance with a first set of imaging device settings and a second image may be captured in accordance with a second set of imaging device settings based on one or more machine vision tools used to analyze the first and second images, respectively. It is to be appreciated that each set of imaging device settings may also be determined based on a distance from the imaging device 104 to the target object and/or any other suitable metric. For example, a first image may be captured in accordance with a first set of imaging device settings and a second image may be captured in accordance with a second set of imaging device settings determined based upon a first distance from the imaging device 104 to the target object and a second distance from the imaging device 104 to the target object, respectively. In this example and others utilizing different metrics and/or more or fewer imaging device settings, each machine vision tool included in the machine vision job may analyze each image capture.

Moreover, for ease of discussion, each of the actions described herein in reference to FIGS. 5 and 6 take place prior to an image capture in accordance with image device settings of a machine vision job. However, it is to be appreciated that each of the actions described herein in reference to FIGS. 5 and 6 may be performed before, during, or after an image capture in accordance with the image device settings of the machine vision job.

The method 500 may include obtaining one or more first images of a target object (block 502). The imaging device 104, for example, may retrieve each of the one more first images from memory (e.g., memory 110, 120), and each of the one or more first images may include a pass indication. Generally speaking, the imaging device 104, by executing one or more machine vision tools included in a machine vision job, may return a pass indication or a fail indication corresponding to an analyzed image. A pass indication generally represents that the respective machine vision tool successfully applied/completed the corresponding machine vision technique. For example, the imaging device 104 may execute a pattern matching tool and generate a pass indication with respect to a specific image if the pattern matching tool is able to identify/match a pattern in the specific image with a known pattern. A fail indication generally represents that the respective machine vision tool failed to apply/complete the corresponding machine vision technique. For example, the imaging device 104 may execute the pattern matching tool and generate a fail indication with respect to the specific image if the pattern matching tool is unable to identify the pattern in the specific image, or if the pattern matching tool is unable to match the pattern in the specific image with a known pattern. Of course, the imaging device 104 may generate a pass indication and/or a fail indication with respect to each executed machine vision job and/or each executed machine vision tool for a myriad of reasons, such as satisfying a technique threshold (e.g., percentage of pattern match within the specific image), satisfying a certainty threshold (e.g., confidence level associated with pattern match), and/or any other suitable metric or combinations thereof.

Thus, as referenced herein, a machine vision job may be "adequately configured" if the machine vision job includes one or more imaging device settings that configure an image capture of the imaging device 104 such that the machine vision tools of the machine vision job may perform their respective machine vision techniques on the image resulting from the image capture. Further, the term "adequately configured" indicates that the results of a machine vision job accurately represent the analysis of each machine vision tool included in the machine vision job. For example, a machine vision job is "adequately configured" when a fail indication resulting from the machine vision techniques performed by one or more of the machine vision tools included in the machine vision job represents an accurate fail indication and is not a false positive (e.g., misrepresented as a fail indication) as a result of an insufficiently configured image capture.

At block 502, the imaging device 104 may obtain/retrieve one or more first images that were previously identified by the imaging device 104 as passing a respective machine vision job. For example, at a time prior to the execution of the actions of block 502, a user/operator may instruct the imaging device 104 to execute an adequately configured machine vision job on a respective image of the one or more first images. As a result, the imaging device 104 may return a pass indication because each machine vision tool included as part of the machine vision job may successfully apply/complete the corresponding machine vision technique. The imaging device 104 may then store the respective image in memory 110, 120 for later obtaining/retrieval at block 502.

The method 500 further includes obtaining one or more second images of the target object (block 504). The imaging device 104, for example, may retrieve each of the one more second images from memory (e.g., memory 110, 120), and each of the one or more second images may include a fail indication. For example, at a time prior to the execution of the actions of block 504, a user/operator may instruct the imaging device 104 to execute an adequately configured machine vision job on a respective image of the one or more second images. As a result, the imaging device 104 may return a fail indication because at least one machine vision tool included as part of the machine vision job may not successfully apply/complete the corresponding machine vision technique. The imaging device 104 may then store the respective image in memory 110, 120 for later obtaining/retrieval at block 504. Thus, at blocks 502 and 504, the imaging device 104 generally obtains images of a target object that are known to either pass or fail a known adequately configured machine vision job. Accordingly, the imaging device 104 may proceed to apply the new and/or adjusted machine vision job to the one or more first and second images to determine whether or not the new and/or adjusted machine vision job is adequately configured.

The method 500 may further include conducting a feasibility setup analysis using each of the one or more first and second images (block 506). The imaging device 104 may conduct the feasibility setup analysis using a feasibility setup tool executed on one or more processors (e.g., processors 108 118). The feasibility setup analysis may include (i) performing one or more machine vision techniques on each of the one or more first images and each of the one or more second images and (ii) generating a respective updated result indication for each of the one or more first images and each of the one or more second images. Generally, performing the one or more machine vision techniques includes the feasibility setup tool applying a new and/or adjusted machine vision job that includes one or more machine vision tools configured to perform the one or more machine vision techniques to each of the one or more first and second images. Accordingly, generating the respective updated result indication may generally include the new and/or adjusted machine vision job returning a fail indication or a pass indication for each of the one or more first and second images.

To illustrate, assume a user/operator creates and/or re-configures a machine vision job to analyze images captured by the machine vision system. The user/operator may, for example, adjust a configuration (e.g., a machine vision tool ROI, threshold settings, etc.) of one or more machine vision tools included in an adjusted machine vision job, adjust a sequence of the machine vision tools within an adjusted machine vision job (e.g., a barcode scanning tool performs a barcode scanning technique on the captured image first, an edge detection tool performs an edge detection technique on the captured image second, etc.), and/or create a unique sequence of machine vision tools for a new machine vision job. In each of these circumstances, the feasibility setup tool may perform the feasibility setup analysis by applying the new and/or adjusted machine vision job to each respective image of the one or more first and second images to determine whether the new and/or adjusted machine vision job returns a respective updated result indication for a respective image that matches the known pass/fail indication corresponding to the respective image.

As previously discussed, the new and/or adjusted machine vision job may include one or more machine vision tools, each configured to perform one or more machine vision techniques on the one or more first and second images. For example, the new and/or adjusted machine vision job may include a barcode scanning tool, a pattern matching tool, an edge detection tool, and/or any other suitable machine vision tool or combinations thereof. Thus, the feasibility setup tool may (as part of the new and/or adjusted machine vision job) apply the barcode scanning tool to each of the one or more first and second images to scan each respective image for a barcode. Similarly, the feasibility setup tool may apply the pattern matching tool and the edge detection tool to each of the one or more first and second images to identify one or more patterns and one or more edges, respectively. The feasibility setup tool may additionally apply these and/or other machine vision tools to each of the one or more first and second images.

In various embodiments, when one or more of the machine vision tools is an AI machine vision tool, the one or more first and second images may be collected or aggregated with other images captured by and/or stored on the imaging device 104 or user computing device 102 and may be analyzed by, and/or used to train, the AI machine vision tool (e.g., an AI tool such as a machine learning imaging tool, as described herein).

In various embodiments, conducting the feasibility setup analysis further includes generating a respective quality value for each of the one or more first images and each of the one or more second images. Generally speaking, a respective quality value refers to an overall quality of an image based upon features/characteristics of the respective image. For example, the respective quality value may include an indication of one or more of (i) a brightness level, (ii) a contrast level, (iii) a feature edge strength value, and/or (iv) a focus value of a respective image.

In various embodiments, the feasibility setup tool applies a sequence of a set of machine vision tools to each of the one or more first and second images, and each tool includes a configuration to perform one or more of the one or more machine vision techniques. Configuration generally refers to the specific settings applied to each machine vision tool included in a machine vision job. For example, if a first machine vision job includes a pattern matching tool with a ROI including the cap 602*a* of the baseline image 602 and a second machine vision job includes the pattern matching tool with a ROI that does not include the cap 604*a* of the current image 604, then the first machine vision job has a different configuration than the second machine vision job. Sequence generally refers to the organization/arrangement of machine vision tools as they are applied during execution of a machine vision job. For example, assume that the imaging device 104 applies a barcode scanning tool first, a pattern matching tool second, and an edge detection tool third when executing a first machine vision job. Further, assume that the imaging device 104 applies the barcode scanning tool first, the edge detection tool second, and the pattern matching tool third when executing a second machine vision job. Thus, in this example, the first machine vision job has a different sequence than the second machine vision job.

In various embodiments, the set of machine vision tools may include, without limitation, (i) a barcode scanning tool, (ii) a pattern matching tool, (iii) an edge detection tool, (iv) a semantic segmentation tool, (v) an object detection tool, and/or (vi) an object tracking tool. As an example, the feasibility setup tool may apply a machine vision job including a barcode scanning tool configured to perform a barcode scanning technique on each of the one or more first or second images. Assume that the barcode scanning tool may optimally perform the barcode scanning technique on an image captured with high contrast. Accordingly, the configuration corresponding to the barcode scanning tool may include a high contrast setting and/or a combination of imaging device settings configured to produce a high contrast image. It should be understood that each machine vision tool referenced and/or otherwise included herein may include multiple reference names/designations, and all such machine vision tools are contemplated for use within the embodiments of the present disclosure.

However, it should be understood that the configuration may also refer to an aggregate configuration of each machine vision tool included in the machine vision job applied by the feasibility setup tool. As another example, assume that a set of machine vision tools included in the machine vision job applied by the feasibility setup tool includes a barcode scanning tool, an edge detection tool, and a pattern matching tool. Further, assume that the barcode scanning tool may optimally perform a barcode scanning technique on an image captured with high contrast, the edge detection tool may optimally perform an edge detection technique on an image captured with medium contrast, and the pattern matching tool may optimally perform a pattern matching technique on an image captured with high gain. An aggregate configuration corresponding to the set of machine vision tools may include a medium contrast setting, a high contrast setting, a high gain setting, and/or a combination of imaging device settings configured to produce a combination of the optimal settings for each machine vision tool.

The method 500 may further include comparing, by the feasibility setup tool, the respective updated result indication to (i) the respective pass indication for each of the one or more first images and (ii) the respective fail indication for each of the one or more second images (block 508). As an example, assume that the imaging device 104 applies the feasibility setup tool to a respective image from each of the one or more first images and the one or more second images, and that the feasibility setup tool generates a respective updated result indication representing a pass indication for the respective image from the one or more first images and a fail indication for the respective image from the one or more second images. Thus, the respective updated result indication for each of the respective images matches the prior known pass/fail indications associated with the respective images, and as a result, the feasibility setup tool may not have any suggested changes/adjustments to the new and/or adjusted machine vision job (block 510).

As another example, assume that the imaging device 104 applies the feasibility setup tool to a respective image from each of the one or more first images and the one or more second images, and that the feasibility setup tool generates a respective updated result indication representing a fail indication for the respective image from the one or more first images and a pass indication for the respective image from the one or more second images. Thus, the respective updated result indication for each of the respective images does not match the prior known pass/fail indications associated with the respective images, and as a result, the feasibility setup tool may proceed to generate one or more suggestions related to changes/adjustments to the new and/or adjusted machine vision job that are configured to optimize the performance of the machine vision system (block 510).

Accordingly, the method 500 may further include, based on the comparing, generating, by the feasibility setup tool, one or more suggestions to optimize the performance of the machine vision system (block 510). Generally speaking, each of the one or more suggestions may include recommended changes to imaging devices (e.g., imaging device 104, external illumination component, etc.) and/or recommended changes to portions of the new and/or adjusted machine vision job. Further, each of the one or more suggestions are configured to bring the machine vision system closer to an optimal performance when executing the new and/or adjusted machine vision job. Accordingly, the one or more suggestions may include at least one of (i) an adjustment to the configuration of a respective machine vision tool, (ii) an adjustment to the sequence of the set of machine vision tools, or (iii) an adjustment to a set of imaging device settings.

As an example, assume the feasibility setup tool performs the feasibility setup analysis and determines that the imaging device 104 is configured to capture images using a longer exposure length and a higher gain value using a respective set of imaging device settings than is optimal based upon one or more machine vision tools included in a new and/or adjusted machine vision job. The feasibility setup tool may generate a first suggestion indicating that the exposure length should be shortened, and may generate a second suggestion indicating that the gain value should be lowered to optimize the performance of the machine vision system (e.g., the imaging device 104). Additionally or alternatively, the feasibility setup tool may generate a single suggestion indicating that the exposure length should be shortened and that the gain value should be lowered in order to optimize the performance of the machine vision system. Moreover, in various embodiments, the set of imaging device settings may include one or more of (i) an aperture size, (ii) an exposure length, (iii) an ISO value, (iv) a focus value, (v) a gain value, or (vi) an illumination control.

In various embodiments, the one or more suggestions may include at least one of (i) a suggestion based upon the respective quality value of a respective image from the one or more first images or the one or more second images or (ii) a suggestion based upon an aggregate quality value of a plurality of images from the one or more first images or the one or more second images. As an example, assume that the feasibility setup tool analyzes a plurality of images from the one or more first images, and generates a respective updated result indication representing a fail indication for each respective image. Further, assume that the new and/or adjusted machine vision job applied by the feasibility setup tool to each of the plurality of the one or more first images includes an edge detection tool that is configured such that the tool will not sufficiently perform an edge detection technique on low contrast images. Assume also that the edge detection tool failed to detect/recognize an edge in any of the plurality of the one or more first images. In this example, the feasibility setup tool may determine that the edge detection tool should be re-configured/adjusted to enable the edge detection tool to better perform the edge detection technique on low contrast images.

The method 500 may further optionally include the actions described in relation to each of blocks 512-516. At block 512, the method 500 may include displaying, on a graphical user interface (GUI), each of the one or more suggestions for viewing by a user. Generally speaking, the imaging device 104 may transmit the generated one or more suggestions to a user computing device (e.g., user computing device 102) across a network (e.g., network 106) for display at a user interface (e.g., I/O interface 114). For example, the user computing device may present a user/operator with a suggestion that reads "Decrease gain setting from XX to YY," where XX and YY are meant to represent suitable alphanumeric, symbolic, and/or other suitable indications or combinations thereof for gain setting values. Moreover, the suggestion in the prior example may further include one or more options for the user/operator to click, swipe, and/or otherwise interact with the user interface to accept or decline the suggested change to the gain setting.

To illustrate, and in reference to FIG. 6, the user computing device may display an interface similar to the example application interface 600, as a result of the execution of the feasibility setup tool. The example application interface 600 may include a feasibility assessment region 602 that generally contains recommendation information generated by the feasibility setup tool. The feasibility assessment region 602 may include a result region 604 that indicates to a user/operator a general result of the feasibility setup analysis. The result region 604 may indicate a pass/fail indication, and/or may include any suitable information and be presented in any suitable format. As shown, the result region 604 may provide a general result similar to "Pattern Match tool is less than 8% difference in score," to convey that the pattern matching tool being described in the feasibility assessment region 602 may need to be re-configured/adjusted to achieve a more optimal machine vision system performance.

Generally speaking, the pass/fail indications displayed in the result region 604 and/or at any other location within the feasibility assessment region 602 may include any alphanumeric characters, symbols, icons, colors, highlighting, pictures and/or other graphical representations, and/or any other suitable indications or combinations thereof. For example, a fail indication may include text indicating that at least one machine vision tool failed to identify a set of alphanumeric characters. As another example, a pass indication may include a green light or other symbol (e.g., a graphical hand in a "thumbs up" configuration) indicative of the machine vision job and/or each machine vision tool successfully performing their respective machine vision techniques. Additionally or alternatively, the pass/fail indication for a respective image and/or portions thereof may be used and/or overlaid on a graphical representation of the respective image.

Accordingly, the feasibility assessment region 602 may further include a recommendation region 606 that includes a tool-specific recommendation to optimize the performance of the corresponding machine vision job (and by extension, the machine vision system). As illustrated, the recommendation region 606 may include a recommendation including alphanumeric characters stating "Change Acceptance Threshold of the pattern tool to be more sensitive to increase the score difference," and/or the recommendation region 606 may include any suitable symbols, icons, colors, highlighting, pictures and/or other graphical representations, and/or any other suitable indications or combinations thereof. Accordingly, the feasibility assessment region 602 may further include a recommended adjustment region 608 that includes a depiction or otherwise indication of the recommendation provided in the recommendation region 606. In the example application interface 600, the recommended adjustment region 608 includes a depiction of the acceptance threshold and a corresponding suggested adjustment to the acceptance threshold, as described in the recommendation region 606. The depiction of the acceptance threshold includes a line-type visual representation of the current and recommended acceptance threshold level, and additionally includes numerical representations of both acceptance threshold levels. However, as previously mentioned, the recommended adjustment region 608 may include any suitable alphanumeric characters, symbols, icons, colors, highlighting, pictures and/or other graphical representations, and/or any other suitable indications or combinations thereof.

The feasibility assessment region 602 may additionally include an automatic update option 610 to allow a user/operator to automatically apply the one or more changes/adjustments indicated in the one or more suggestions to the machine vision job and/or the set of imaging device settings. Additionally or alternatively, the automatic update option 610 may allow a user/operator to confirm that they have manually applied the one or more changes/adjustments indicated in the one or more suggestions. For example, the one or more suggestions may indicate to a user/operator that the external illumination should be increased to optimize the performance of the machine vision system, and the feasibility assessment region 602 may specifically provide one or more changes/adjustments the user/operator should make (e.g., increase illumination by 10%). The user/operator may manually adjust the external illumination component and click, swipe, and/or otherwise interact with the automatic update option 610 to confirm that the external illumination has been adjusted accordingly. Of course, in various embodiments, the feasibility setup tool (in response to a user/operator interaction with the feasibility assessment region 602) may automatically adjust one or more imaging device settings (e.g., imaging device 104 settings) and/or any additional component settings (e.g., external illumination component(s)).

Generally, the example application interface 600 of FIG. 6 depicts a result of the feasibility setup analysis related to a single machine vision tool (e.g., a pattern matching tool). However, it is to be understood that the one or more suggestions displayed to a user/operator at block 512 may be related to an entire machine vision job, multiple portions of a machine vision job, and/or any other suitable granularity level or combinations thereof.

The method 500 may further include obtaining, by the feasibility setup tool, a user input indicating an acceptance of one or more of the one or more suggestions (block 514). For example, the user/operator may interact with the automatic update option 610 and/or any other suitable selectable buttons or other suitable selectable icons/graphics to accept the suggested changes included in the one or more suggestions related to the set of imaging device settings and/or the new and/or adjusted machine vision job, and the method 500 may proceed to block 516. Alternatively, the user/operator may interact with the automatic update option 610 and/or any other suitable selectable buttons or other suitable selectable icons/graphics to decline the suggested changes included in the one or more suggestions related to the set of imaging device settings and/or the new and/or adjusted machine vision job. In response, the user computing device 102 may instruct the imaging device 104 to re-perform the feasibility setup analysis on all or a portion of the one or more first images and the one or more second images.

The method 500 may further include responsive to the user input, automatically adjusting, by the feasibility setup tool, a feature indicated in the one or more of the one or more suggestions (block 516). Generally speaking, the feature may include, without limitation, adding one or more machine vision tools that were not included in the new and/or adjusted machine vision job, removing one or more machine vision tools that were included in the new and/or adjusted machine vision job, adjusting one or more configurations of the one or more machine vision tools added/included in the new and/or adjusted machine vision job, and/or adjusting one or more imaging device settings included in the set of imaging device settings. For example, a machine vision tool included in the new and/or adjusted machine vision job may require high contrast and medium/low brightness images for optimal performance. However, the set of imaging device settings may include a low contrast setting and a high brightness setting. The imaging device 104 and/or the user computing device 102 (e.g., via the feasibility setup tool) may generate one or more suggestions indicating that the contrast setting should be increased and that the brightness setting should be decreased. Accordingly, in response to generating the one or more suggestions and/or upon obtaining/receiving a user acceptance of the one or more suggestions, the imaging device 104 and/or the user computing device 102 (e.g., via the feasibility setup tool) may automatically adjust the contrast setting to a high setting and may automatically adjust the brightness setting to a medium/low setting.

In various embodiments, the imaging device 104 (via the feasibility setup tool) may be configured to automatically adjust the imaging settings for the imaging assembly (e.g., imaging assembly 126) and any additional components included as part of the imaging device 104. For example, in response to generating the one or more suggestions and/or upon obtaining/receiving a user acceptance of the one or more suggestions, the imaging device 104 may be configured to automatically adjust the illumination setting of an external and/or internal illumination device. Of course, in these embodiments, the imaging device may be configured to adjust the imaging settings associated with any number and/or type of additional components that are internally/externally included as part of the imaging device.

Of course, it is to be understood that the imaging device 104 or other suitable imaging system may automatically adjust the feature indicated in the one or more suggestions without receiving a user input. For example, the imaging device 104 may automatically adjust the feature to be in accordance with the optimal imaging device settings of one or more of the machine vision tools included in the new and/or adjusted machine vision job as a real-time response to the comparison performed by the feasibility setup tool.

Additionally, it is to be understood that each of the actions described in the method 500 may be performed in any order, number of times, or any other combination(s) therein suitable to optimize the performance of a machine vision system. For example, some or all of the blocks of the method 500 may be fully performed once, multiple times, or not at all.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for optimizing a performance of a machine vision system, the method comprising:
    obtaining, by one or more processors, one or more first images of a target object, each of the one or more first images including a pass indication output by a previously executed machine vision job that analyzed each of the one or more first images;
    obtaining, by the one or more processors, one or more second images of the target object, each of the one or more second images including a fail indication output by the previously executed machine vision job that analyzed each of the one or more second images;
    preparing a new and/or adjusted machine vision job that includes one or more machine vision tools configured to perform one or more machine vision techniques to each of the one or more first images and the one or more second images;
    conducting, by a feasibility setup tool executed on the one or more processors, a feasibility setup analysis by (i) performing the one or more machine vision techniques of the new and/or adjusted machine vision job on each of the one or more first images and each of the one or more second images and (ii) generating a respective updated result indication for each of the one or more first images and each of the one or more second images;
    comparing, by the feasibility setup tool, the respective updated result indication to (i) the respective pass indication for each of the one or more first images and (ii) the respective fail indication for each of the one or more second images; and
    based on the comparing, generating, by the feasibility setup tool, one or more suggestions to optimize the performance of the machine vision system.

2. The method of claim 1, wherein conducting the feasibility setup analysis further includes generating a respective quality value for each of the one or more first images and each of the one or more second images.

3. The method of claim 2, wherein the respective quality value may include an indication of one or more of (i) a brightness level, (ii) a contrast level, (iii) a feature edge strength value, or (iv) a focus value.

4. The method of claim 2, wherein the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

5. The method of claim 1, further comprising:
    displaying, on a graphical user interface (GUI), each of the one or more suggestions for viewing by a user;
    obtaining, by the feasibility setup tool, a user input indicating an acceptance of one or more of the one or more suggestions; and
    responsive to the user input, automatically adjusting, by the feasibility setup tool, a feature indicated in the one or more of the one or more suggestions.

6. The method of claim 1, wherein the feasibility setup tool applies a sequence of a set of machine vision tools, each tool including a configuration to perform one or more of the one or more machine vision techniques.

7. The method of claim 6, wherein the one or more suggestions include at least one of (i) an adjustment to the configuration of a respective machine vision tool, (ii) an adjustment to the sequence of the set of machine vision tools, or (iii) an adjustment to a set of imaging device settings.

8. The method of claim 7, wherein each of the set of imaging device settings includes one or more of (i) an aperture size, (ii) an exposure length, (iii) an ISO value, (iv) a focus value, (v) a gain value, or (vi) an illumination control.

9. The method of claim 6, wherein the one or more machine vision tools include at least one of (i) a barcode scanning tool, (ii) a pattern matching tool, (iii) an edge detection tool, (iv) a semantic segmentation tool, (v) an object detection tool, or (vi) an object tracking tool.

10. A computer system for optimizing a performance of a machine vision system, the system comprising:
    one or more processors; and
    a non-transitory computer-readable memory coupled to the imaging device and the one or more processors, the memory storing instructions thereon that, when executed by the one or more processors, cause the one or more processors to:
        obtain one or more first images of a target object, each of the one or more first images including a pass indication output by a previously executed machine vision job that analyzed each of the one or more first images, obtain one or more second images of the target object, each of the one or more second images including a fail indication output by a previously executed machine vision job that analyzed each of the one or more second images, prepare a new and/or adjusted machine vision job that includes one or more machine vision tools configured to perform one or more machine vision techniques to each of the one or more first images and the one or more second images, and execute a feasibility setup tool configured to:
conduct a feasibility setup analysis by (i) performing the one or more machine vision techniques of the new and/or adjusted machine vision job on each of the one or more first images and each of the one or more second images and (ii) generating a respective updated result indication for each of the one or more first images and each of the one or more second images, compare the respective updated result indication to (i) the respective pass indication for each of the one or more first images and (ii) the respective fail indication for each of the one or more second images, and based on the comparing, generate one or more suggestions to optimize the performance of the machine vision system.

11. The computer system of claim 10, wherein conducting the feasibility setup analysis further includes generating a respective quality value for each of the one or more first images and each of the one or more second images.

12. The computer system of claim 11, wherein the respective quality value may include an indication of one or more of (i) a brightness level, (ii) a contrast level, (iii) a feature edge strength value, or (iv) a focus value.

13. The computer system of claim 11, wherein the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

14. The computer system of claim 10, wherein the instructions, when executed by the one or more processors, further cause the one or more processors to:
display, on a graphical user interface (GUI), each of the one or more suggestions for viewing by a user;
obtain a user input indicating an acceptance of one or more of the one or more suggestions; and
responsive to the user input, automatically adjust a feature indicated in the one or more of the one or more suggestions.

15. The computer system of claim 10, wherein the feasibility setup tool applies a sequence of a set of machine vision tools, each tool including a configuration to perform one or more of the one or more machine vision techniques.

16. A tangible machine-readable medium comprising instructions for optimizing a performance of a machine vision system that, when executed, cause a machine to at least:
obtain one or more first images of a target object, each of the one or more first images including a pass indication output by a previously executed machine vision job that analyzed each of the one or more first images;
obtain one or more second images of the target object, each of the one or more second images including a fail indication output by a previously executed machine vision job that analyzed each of the one or more second images;
preparing a new and/or adjusted machine vision job that includes one or more machine vision tools configured to perform one or more machine vision techniques to each of the one or more first images and the one or more second images; and
execute a feasibility setup tool configured to:
conduct a feasibility setup analysis by (i) performing the one or more machine vision techniques of the new and/or adjusted machine vision job on each of the one or more first images and each of the one or more second images and (ii) generating a respective updated result indication for each of the one or more first images and each of the one or more second images,
compare the respective updated result indication to (i) the respective pass indication for each of the one or more first images and (ii) the respective fail indication for each of the one or more second images, and
based on the comparing, generate one or more suggestions to optimize the performance of the machine vision system.

17. The tangible machine-readable medium of claim 16, wherein conducting the feasibility setup analysis further includes generating a respective quality value for each of the one or more first images and each of the one or more second images.

18. The tangible machine-readable medium of claim 17, wherein the respective quality value may include an indication of one or more of (i) a brightness level, (ii) a contrast level, (iii) a feature edge strength value, or (iv) a focus value.

19. The tangible machine-readable medium of claim 17, wherein the one or more suggestions include at least one of (i) a suggestion based upon the respective quality value of a respective image from the one or more first images or the one or more second images or (ii) a suggestion based upon an aggregate quality value of a plurality of images from the one or more first images or the one or more second images.

20. The tangible machine-readable medium of claim 16, wherein the instructions, when executed, further cause the machine to at least:
display, on a graphical user interface (GUI), each of the one or more suggestions for viewing by a user;
obtain a user input indicating an acceptance of one or more of the one or more suggestions; and
responsive to the user input, automatically adjust a feature indicated in the one or more of the one or more suggestions.

* * * * *